US007855705B2

(12) United States Patent
Nirmal et al.

(10) Patent No.: US 7,855,705 B2
(45) Date of Patent: Dec. 21, 2010

(54) COLOR LIQUID CRYSTAL DISPLAY PANEL DESIGN

(75) Inventors: Manoj Nirmal, St. Paul, MN (US); Jane K. Wardhana, St. Paul, MN (US); Jason C. Radel, St. Louis Park, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 742 days.

(21) Appl. No.: 11/772,906

(22) Filed: Jul. 3, 2007

(65) Prior Publication Data

US 2009/0009710 A1    Jan. 8, 2009

(51) Int. Cl.
*G09G 3/36*    (2006.01)
(52) U.S. Cl. .......................................................... 345/87
(58) Field of Classification Search .................. 345/30, 345/55, 84, 87, 88; 349/167–169, 175, 176, 349/106, 113, 115
See application file for complete search history.

(56) References Cited

U.S. PATENT DOCUMENTS

| | | | |
|---|---|---|---|
| 4,293,435 A | 10/1981 | Portugall | |
| 5,332,522 A | 7/1994 | Chen | |
| 5,516,455 A | 5/1996 | Jacobine | |
| 5,744,057 A | 4/1998 | Meyer | |
| 5,780,629 A | 7/1998 | Etzbach | |
| 5,808,794 A | 9/1998 | Weber | |
| 5,847,068 A | 12/1998 | Maxein | |
| 5,886,242 A | 3/1999 | Etzbach | |
| 6,252,640 B1 | 6/2001 | Kim et al. | |
| 6,549,261 B1 * | 4/2003 | Okada et al. | 349/176 |
| 6,580,482 B1 | 6/2003 | Hiji et al. | |
| 7,193,777 B2 * | 3/2007 | Umeya | 359/459 |
| 2003/0160923 A1 | 8/2003 | Ma | |
| 2003/0231269 A1 | 12/2003 | Ma | |
| 2006/0050198 A1 * | 3/2006 | Kirita et al. | 349/61 |
| 2006/0181658 A1 | 8/2006 | Majumdar | |
| 2006/0204681 A1 | 9/2006 | Kim et al. | |
| 2006/0244702 A1 | 11/2006 | Yamazaki | |
| 2007/0076135 A1 * | 4/2007 | Gomyou et al. | 349/25 |
| 2007/0290975 A1 * | 12/2007 | Gan et al. | 345/94 |

FOREIGN PATENT DOCUMENTS

KR    10-2006-0110677    10/2006

OTHER PUBLICATIONS

U.S. Appl. No. 11/557,540, filed Nov. 8, 2006, Lewandowski.

* cited by examiner

*Primary Examiner*—Richard Hjerpe
*Assistant Examiner*—Jeffrey Parker

(57) ABSTRACT

A method of forming a liquid crystal display includes determining an illuminant blue peak wavelength, an illuminant green peak wavelength, and an illuminant red peak wavelength, and assembling a liquid crystal display with a blue light reflecting liquid crystal layer having a blue peak reflection wavelength being a shorter wavelength than the illuminant blue peak wavelength, and a green light reflecting liquid crystal layer having a green peak reflection wavelength substantially equal to or longer than the illuminant green peak wavelength, and a red light reflecting liquid crystal layer having a red peak reflection wavelength being a longer wavelength than the illuminant red peak wavelength. Liquid crystal displays are also described.

16 Claims, 2 Drawing Sheets

COLOR LIQUID CRYSTAL DISPLAY PANEL DESIGN

FIELD

The present disclosure relates to color liquid crystal display panel design and particularly to full color reflective display panel color design.

BACKGROUND

A reflective display's color gamut depends on both the intrinsic red, green, and blue primaries of the display and the illumination spectrum. Cholesteric liquid crystal layers are utilized in reflective displays to reflect light of a particular wavelength and transmit all other light wavelengths.

A cholesteric liquid crystal consists of a nematic liquid crystal and a chiral additive blended together to spontaneously form a helical structure with a defined pitch. This pitch determines the wavelength of light reflected by and hence the perceived color of the material. A pixel in a cholesteric liquid crystal display can be switched between its planar reflective state and its semi-transparent focal conic state, by application of an appropriate drive scheme. In its reflective state, the observed color of the device is a combination of the cholesteric reflection and the background color.

A full color cholesteric liquid crystal display can be made by stacking a set of red, green, and blue reflecting liquid crystal panels on top of each other. A typical display configuration with diffuse illumination at all angles provides an observed color that depends, in part, on the observed viewing angle. The observed color shifts to shorter wavelengths at more oblique angles from normal or on-axis. This effect is undesirable in a display as it leads to diminished color saturation in the observed image.

BRIEF SUMMARY

The present disclosure relates to color liquid crystal display panel deign and particularly to full color reflective display panel color design. This disclosure further relates to the design of a reflective cholesteric liquid crystal display with red, blue, and green primaries that yield optimal on-axis color performance and minimizes off-axis color shift under specified illumination conditions. The observed color gamut can be maximized and the off-axis color shift can be minimized by careful positioning of cholesteric liquid crystal red, blue, and green primaries reflectance peaks relative to the illumination spectrum.

In a first embodiment, a method of forming a liquid crystal display includes determining an illuminant blue peak wavelength, an illuminant green peak wavelength, and an illuminant red peak wavelength, and assembling a liquid crystal display with a blue light reflecting liquid crystal layer having a blue peak reflection wavelength being a shorter wavelength than the illuminant blue peak wavelength, and a green light reflecting liquid crystal layer having a green peak reflection wavelength substantially equal to or longer than the illuminant green peak wavelength, and a red light reflecting liquid crystal layer having a red peak reflection wavelength being a longer wavelength than the illuminant red peak wavelength.

In another embodiment, a liquid crystal display includes a blue light reflecting liquid crystal layer having a blue peak reflection wavelength, a green light reflecting liquid crystal layer having a green peak reflection wavelength, and a red light reflecting liquid crystal layer having a red peak reflection wavelength. The liquid crystal display is configured to be illuminated by an illuminant having an illuminant blue peak wavelength, an illuminant green peak wavelength, and an illuminant red peak wavelength. The blue light reflecting liquid crystal layer blue peak reflection wavelength is a shorter wavelength than the illuminant blue peak wavelength. The green light reflecting liquid crystal layer green peak reflection wavelength is substantially equal to or longer than the illuminant green peak wavelength. The red light reflecting liquid crystal layer red peak reflection wavelength is a longer wavelength than the illuminant red peak wavelength.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The present disclosure relates to color liquid crystal display panel design and particularly to full color reflective display panel color design. This disclosure further relates to the design of a reflective cholesteric liquid crystal display with red, blue, and green primaries that yield optimal on-axis color performance and minimizes off-axis color shift under specified illumination conditions. The observed color gamut can be maximized and the off-axis color shift can be minimized by careful positioning of cholesteric liquid crystal red, blue, and green primaries reflectance peaks relative to the illumination spectrum. While the present invention is not so limited, an appreciation of various aspects of the invention will be gained through a discussion of the examples provided below.

Figure 1:
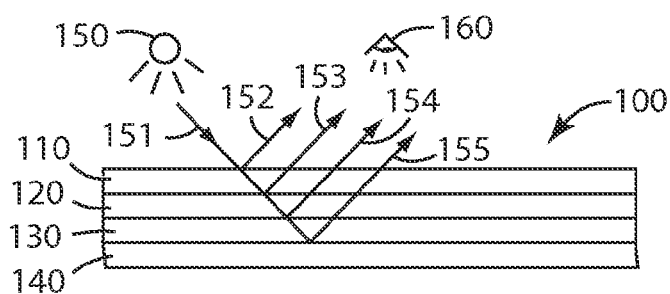
FIG. 1 is a schematic side view of an illustrative liquid crystal display.

FIG. 1 is a schematic side view of an illustrative liquid crystal display 100. In many embodiments, the liquid crystal display 100 is a full color liquid crystal display having a blue light reflecting liquid crystal layer 110 having a blue peak reflection wavelength, a green light reflecting liquid crystal layer 120 having a green peak reflection wavelength, and a red light reflecting liquid crystal layer 130 having a red peak reflection wavelength. The order of the color layers is arbitrary and can be stacked in any color order, and is not limited to the color order shown in the figures. The liquid crystal display 100 can include a base or substrate layer 140 that can provide a background color 155 when illuminated, as desired.

In many embodiments, the liquid crystal display 100 is a cholesteric liquid crystal display, or a cholesteric liquid crystal reflective display. In some embodiments, the cholesteric liquid crystal reflective display is a bistable cholesteric liquid crystal reflective display such as, for example, a passive matrix display. Unlike a conventional nematic liquid crystal based display, a cholesteric liquid crystal display does not require polarizers or color filters, resulting in a simpler display device construction. In a full color nematic liquid crystal based display the red, blue, and green sub pixels are arranged side by side. As a result, only a third of the viewing area is occupied by each of the individual red, blue, and green primaries. On the other hand, each cholesteric liquid crystal red, blue, and green sub pixel reflects a single primary while transmitting the other two primaries. A full color cholesteric liquid crystal display can be constructed by stacking a set of red, blue, and green panels on top of each other, with the individual red, blue, and green pixels on top of each other. The entire viewing area can thus be utilized by each of the three colors, resulting in improved display brightness.

These displays can include polymer dispersed liquid crystal films sandwiched between transparent electrodes that can be switched from a weakly scattering focal conic state to a reflective planar state upon applying an electric field (E) to the electrodes. Both of these states are stable at E=0. This means that the textures are "locked in" and will remain intact until acted upon again (i.e., the device is bistable). Switching from planar to focal conic states requires a low voltage pulse while the return from focal conic to planar requires a higher voltage pulse to drive the device into a homeotropic state which then relaxes to the final planar state.

The liquid crystal display 100 is configured to be illuminated by an illuminant 150. The illuminant 150 can be any useful illuminating source such as, for example, a solar source, an incandescent source, a fluorescent source, and/or a solid state light source. The illuminant 150 light 151 has an illuminant blue peak wavelength, an illuminant green peak wavelength, and an illuminant red peak wavelength, that can be determined using conventional techniques such as, for example by spectrometry. The first layer 110 is capable of reflecting primarily light of a first color such as, blue light 152. The second layer 120 is capable of reflecting primarily light of a second color such as, green light 153. The third layer 130 is capable of reflecting primarily light of a third color such as, red light 154 to an observer 160.

A cholesteric liquid crystal consists of a nematic liquid crystal and a chiral additive blended together to spontaneously form a helical structure with a defined pitch. This pitch determines the wavelength of light reflected by and hence the perceived color of the material. Applicants have discovered that the observed color gamut of a choesteric liquid crystal display can be maximized and the off-axis color shift minimized by careful positioning of the cholesteric liquid crystal red, blue, and green primaries relative to the illumination spectrum. In specific embodiments, the blue light reflecting liquid crystal layer blue peak reflection wavelength is a shorter wavelength than the illuminant blue peak wavelength, the green light reflecting liquid crystal layer green peak reflection wavelength is substantially equal to or longer than the illuminant green peak wavelength, and the red light reflecting liquid crystal layer red peak reflection wavelength is a longer wavelength than the illuminant red peak wavelength.

In some embodiments, the blue light reflecting liquid crystal layer has a peak reflectance value and the blue light reflecting liquid crystal layer has a reflectance value in a range of 50 to 90% of the peak reflectance value at the illuminant blue peak wavelength, and the red light reflecting liquid crystal layer has a peak reflectance value, and the red light reflecting liquid crystal layer has a reflectance value in a range of 50 to 90% of the peak reflectance value at the illuminant blue peak wavelength. In other embodiments, the blue light reflecting liquid crystal layer has a peak reflectance value and the blue light reflecting liquid crystal layer has a reflectance value in a range of 70 to 90%, or 80 to 90% of the peak reflectance value at the illuminant blue peak wavelength, and the red light reflecting liquid crystal layer has a peak reflectance value and the red light reflecting liquid crystal layer has a reflectance value in a range of 70 to 90%, or 80 to 90% of the peak reflectance value at the illuminant red peak wavelength. In many of these embodiments, the green light reflecting liquid crystal layer green peak reflection wavelength is substantially equal to or longer than the illuminant green peak wavelength.

Figure 2:
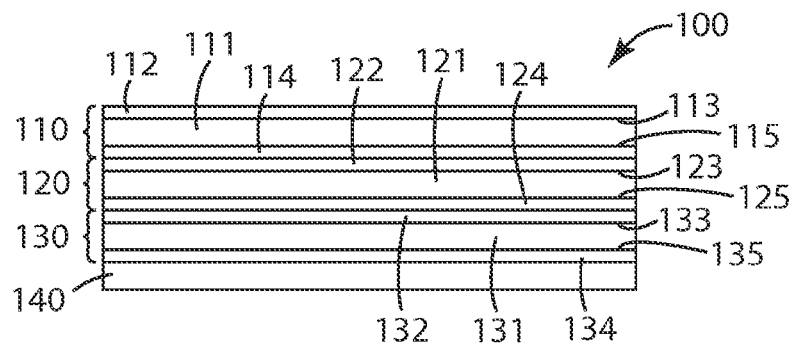
FIG. 2 is a schematic side view of another illustrative liquid crystal display.

FIG. 2 is a schematic side view of another illustrative liquid crystal display 100. The liquid crystal display 100 is a full color liquid crystal display having a blue light reflecting liquid crystal layer 110 having a blue peak reflection wavelength, a green light reflecting liquid crystal layer 120 having a green peak reflection wavelength, and a red light reflecting liquid crystal layer 130 having a red peak reflection wavelength. The order of the color layers is arbitrary and can be stacked in any color order, and is not limited to the color order shown in the figures. The liquid crystal display 100 can include a base or substrate layer 140 that can provide a background color when illuminated, as desired.

Each liquid crystal layer 110, 120, 130, includes a layer of liquid crystal material 111, 121, 131 disposed between a first substrate 112, 122, 132 and a second substrate 114, 124, 134. Each first substrate 112, 122, 132 includes a first conductive inner surface 113, 123, 133 and each second substrate 114, 124, 134 includes a second conductive inner surface 115, 125, 135. This display 100 can be a full color cholesteric liquid crystal display and bistable display device, as described above. Each layer of liquid crystal material 111, 121, 131 is in contact with the first conductive inner surface 113, 123, 133 and the second conductive inner surface 115, 125, 135. In some embodiments, one or more spacers (not shown) are disposed between the first substrate 112, 122, 132 and the second substrate 114, 124, 134. Spacers can set the distance between the first substrate 112, 122, 132 and the second substrate 114, 124, 134.

The first substrate 112, 122, 132 and the second substrate 114, 124, 134 can be formed of any useful material such as, for example, glass or polymer. In many embodiments, one or both substrates can be transparent to visible light. In many embodiments, the first substrate and the second substrate are formed from a suitable polymeric material that has sufficient mechanical properties (e.g., strength and flexibility) to be processed in a roll-to-roll apparatus. By roll-to-roll, what is meant is a process where material is wound onto or unwound from a support, as well as further processed in some way. Examples of further processes include coating, slitting, blanking, and exposing to radiation, or the like. Examples of such polymers include thermoplastic polymers. Examples of useful thermoplastic polymers include polyolefins, polyacrylates, polyamides, polyimides, polycarbonates, polyesters, and biphenol- or naphthalene-based liquid crystal polymers. Further examples of useful thermoplastics include polyethylene, polypropylene, polystyrene, poly(methylmethacrylate), polycarbonate of bisphenol A, poly(vinyl chloride), polyethylene terephthalate, polyethylene naphthalate, and poly(vinylidene fluoride). Some of these polymers also have optical properties (e.g., transparency) that make them especially well-suited for certain display applications wherein they would support a patterned conductor, such as polycarbonates, polyimides, and/or polyesters.

In some embodiments, the first substrates and the second substrates are flexible. The first substrates and the second substrates can have any useful thickness. These substrates can be manufactured in a variety of thickness, ranging in general from about 5 micrometers to 1000 micrometers or from 25 micrometers to 500 micrometers, or from 50 micrometers to 250 micrometers, or from 75 micrometers to 200 micrometers.

The first substrates 112, 122, 132 conductive inner surface 113, 123, 133 and the second substrate 114, 124, 134 conductive inner surface 115, 125, 135 can be formed in any useful manner such as, for example, sputtering, chemical vapor deposition, screen printing, inkjet printing, and the like. In many embodiments, a patterned conductor forms one or both of the conductive inner surfaces. The patterned conductor can be formed on one or all substrates by known techniques. The patterned conductor can be a relatively conductive, transparent coating. In many embodiments, the patterned conductor is transparent to visible light. The patterned conductor can include indium tin oxide or ITO, which can be transparent to visible light, depending on the thickness of the ITO conductor. In many embodiments, the patterned conductor has a generally uniform sheet resistivity. The patterned conductor can have any useful thickness such as, for example, a thickness of 10-100 nm. The pattern of the conductor may depend in part on the type of display and design parameters, such as size of end user display, etc. The patterned conductor can include a tin antimony oxide, a zinc oxide, or other appropriate conductive material.

The liquid crystal layer 111, 121, 131 can be formed of any liquid crystal useful for display applications such as passive matrix displays. In many embodiments, the liquid crystal layer 111, 121, 131 is formed of a cholesteric liquid crystal. Cholesteric liquid crystal compounds generally include molecular units that are chiral in nature (e.g., molecules that do not possess a mirror plane) and molecular units that are mesogenic in nature (e.g., molecules that exhibit liquid crystal phases) and can be polymers. Cholesteric liquid crystal compositions may also include achiral liquid crystal compounds (nematic) mixed with or containing a chiral unit. Cholesteric liquid crystal compositions or materials include compounds having a cholesteric liquid crystal phase in which the director (the unit vector that specifies the direction of average local molecular alignment) of the liquid crystal rotates in a helical fashion along the dimension perpendicular to the director. Cholesteric liquid crystal compositions are also referred to as chiral nematic liquid crystal compositions. The pitch of the cholesteric liquid crystal composition or material is the distance (in a direction perpendicular to the director and along the axis of the cholesteric helix) that it takes for the director to rotate through 360 degrees. This distance is generally 100 nm or more.

The pitch of a cholesteric liquid crystal material can be induced by mixing or otherwise combining (e.g., by copolymerization) a chiral compound with a nematic liquid crystal compound. The cholesteric phase can also be induced by a chiral non-liquid crystal material. The pitch may depend on the relative ratios by weight of the chiral compound and the nematic liquid crystal compound or material. The helical twist of the director results in a spatially periodic variation in the dielectric tensor of the material, which in turn gives rise to the wavelength selective reflection of light. For example, the pitch can be selected such that the Bragg reflection is peaked in the visible, ultraviolet, or infrared wavelength regimes of light.

Cholesteric liquid crystal compounds, including cholesteric liquid crystal polymers, are generally known and typically any of these materials can be used to make optical bodies. Examples of suitable cholesteric liquid crystal polymers are described in U.S. Pat. Nos. 4,293,435, 5,332,522, 5,886,242, 5,847,068, 5,780,629, and 5,744,057, all of which are incorporated herein by reference. Other cholesteric liquid crystal compounds can also be used. A cholesteric liquid crystal compound may be selected for a particular application or optical body based on one or more factors including, for example, refractive indices, surface energy, pitch, processability, clarity, color, low absorption in the wavelength of interest, compatibility with other components (e.g., a nematic liquid crystal compound, etc.), molecular weight, ease of manufacture, availability of the liquid crystal compound or monomers to form a liquid crystal polymer, rheology, method and requirements of curing, ease of solvent removal, physical and chemical properties (for example, flexibility, tensile strength, solvent resistance, scratch resistance, and phase transition temperature), and ease of purification.

In many embodiments, cholesteric liquid crystal layer is a polymer dispersed liquid crystal composition that includes a liquid crystal phase dispersed (disperse phase) within a polymeric matrix (continuous phase). In many embodiments, the polymer dispersed liquid crystal composition is formed by polymerization induced phase separation (PIPS), where the size of the formed liquid crystal phase droplets is at least partially controlled by polymerization kinetics.

In many embodiments, this construction forms a bistable reflective cholesteric liquid crystal display or passive matrix display. Application of an electric field (E) across the conductive surfaces causes the liquid crystal to be aligned in either the reflective planar state or the scattering focal conic state. Both of these states are stable at E=0, thus the textures are locked in and will remain intact until acted upon again (i.e., the device is bistable). Switching from the planar to focal conic requires a low voltage pulse while the return from focal conic to planar requires a higher voltage pulse to drive the device into a homeotropic state which then relaxes to the final planar state. An illustrative drive scheme for switching single pixel cholesteric liquid crystal display (i.e., ChLCD) cells is described by Deng-Ke Yang et. al., (Annu. Rev. Mater. Sci. 1977, 27, 117-146). According to reflectance versus voltage plots described therein ChLCD cells can be switched to a voltage value at which the cell is in the planar state or voltage value at which point the cell is in the focal conic state. The associated pulse trains (frequency and amplitude) can be practiced by anyone skilled in the art.

Exemplary liquid crystal compositions are described in U.S. patent application Ser. No. 11/557,540 filed on Nov. 8, 2006, the disclosure of which is incorporated by reference herein and the disclosure therein gives corresponding stable planar state reflection. By stable state reflection it is meant that after being driven to the planar state by a voltage V5 the cell experiences no loss of reflection after standing at ambient conditions for about three days.

The liquid crystal layer 111, 121, 131 can have any useful thickness such as, for example, a thickness in a range from 1 to 15 micrometers. This polymer dispersed liquid crystal layer 111, 121, 131 having a thickness in a range from 1 to 15 micrometers can be formed via radiation curing in a range from 0.1 to 10 mW/cm$^2$ or in a range from 0.2 to 3 mW/cm$^2$.

The polymer dispersed liquid crystal layer 111, 121, 131 can be formed by a process in which a reactive pre-polymer/liquid crystal composition is mixed and polymerized. In many embodiments, the reactive pre-polymer/liquid crystal composition forms a single phase where the liquid crystal does not polymerize. As the composition polymerizes, the polymer separates from the liquid crystal forming liquid crystal domains (e.g., droplets) dispersed within a polymer matrix. This phase separation process is termed polymerization induced phase separation (i.e., PIPS). In the PIPS process, the polymer phase separates from the liquid crystal during polymerization as the polymer chain length increases. The reactive pre-polymer/liquid crystal composition includes a liquid crystal component, a photo polymerization initiator and a polymer precursor component. The components are chosen so that pre-polymer/liquid crystal composition forms a single phase until it is polymerized.

The liquid crystal component can be any useful liquid crystal such as, for example, a cholesteric liquid crystal material or a nematic liquid crystal material. The liquid crystal can be present in the composition in any useful amount. In many embodiments, the liquid crystal can be present in the composition a range from 60 to 95% wt, or from 70 to 95% wt.

The photo polymerization initiator can be any useful photo polymerization initiator. In many embodiments, the photo initiator includes hydroxy-alkylbenzophenones (e.g., Darocur™ available from Merck), benzoin ethers, alkylphenones, benzophenones, xanthones, thioxanthones, phosphine oxides (e.g., Irgacure™ 819 available from Ciba Specialty Chemicals), and their derivatives. Additional useful photo polymerization initiators are described in U.S. Pat. No. 5,516,455 and is incorporated by reference to the extent it does not conflict with the present disclosure. The photo polymerization initiator can be present in the composition in any useful amount. In many embodiments, the photo polymerization initiator can be present in a range from 0.01 to 10% wt, or from 0.1 to 5% wt, or from 1 to 2% wt.

In some embodiments, the liquid crystal layer 111, 121, 131 includes spacer beads (not shown) to assisting in providing a uniform spacing between the polymeric substrates.

EXAMPLE

Materials

Methacryloxypropyl trimethoxysilane is commercially available from Lancaster Synthesis Ltd., Ward Hill, Mass.
Elvacite 4059 is commercially available from Lucite International, Cordova, Tenn.
Hexanediol dimethacrylate is commercially available (under the trade designation SR 239) from Exton, Pa.
Irgacure-819 is commercially available from Ciba Specialty Corp, Basel, Switzerland.
MDA-01-1955 is a mixture of chiral and nematic liquid crystals and MDA-00-3506 is a nematic liquid crystal. These cholesteric liquid crystal materials are experimental materials from EMD Chemicals Inc., San Diego, Calif. an affiliate of Merck KGaA, Darmstadt, Germany.

A pre-polymer solution was prepared by combining methacryloxypropyl trimethoxysilane (1.3 g, 65% by mass), Elvacite 4059 (0.30 g, 15% by mass), and hexanediol dimethacrylate (0.40 g, 20% by mass). This solution was agitated on a shaker at room temperature for about 16 hours to give a clear solution. The photo-initiator Irgacure-819 was added (0.03 g, 1.5% of pre-polymer mass) and the vial was sealed and shaken until the photo-initiator was dissolved.

Cholesteric liquid crystal solutions were formulated by mixing MDA-01-1955 and MDA-00-3506 in different ratios to give the following reflection peak wavelengths of Table 1:

TABLE 1

| Peak Reflection Wavelength | MDA-01-1955 (Mass %) | MDA-00-3506 (Mass %) |
|---|---|---|
| 468 nm | 97 | 3 |
| 488 nm | 92 | 8 |
| 516 nm | 87 | 13 |
| 546 nm | 82 | 18 |
| 560 nm | 79 | 21 |
| 612 nm | 72 | 28 |
| 635 nm | 69 | 31 |

A mixture of cholesteric liquid crystal coating solution (for each reflection wavelength) was prepared by mixing the pre-polymer mixture (described above) with each cholesteric liquid crystal solution (described above), and with 3 micrometer spacer beads (commercially available under the trade designation SP-203, from Sekisui, Japan), in the following ratio described in Table 2.

TABLE 2

|  | % Mass | Mass (grams) |
|---|---|---|
| Total Mass of Mixture | 100 | 2 |
| Spacer Beads | 1.5 | 0.03 |
| Pre-polymer | 20 | 0.4 |
| Cholesteric liquid crystal solution | 80 | 1.6 |

A display device was fabricated by coating a layer of the above mixture (about 5 micrometers thickness) between a 200 ohm/square 12-pixel ITO-patterned polyethylene terephthalate substrates. The laminated assembly was then placed under a 1 mW/cm$^2$ ultraviolet light (available under the trade designation 350 BL, from Sylvania, Danvers, Mass.), and the coating layer was cured for 15 minutes to give the cholesteric liquid crystal cell. A cholesteric liquid crystal cell was constructed, as described above, for each cholesteric liquid crystal solution listed in Table 1.

Figure 3:
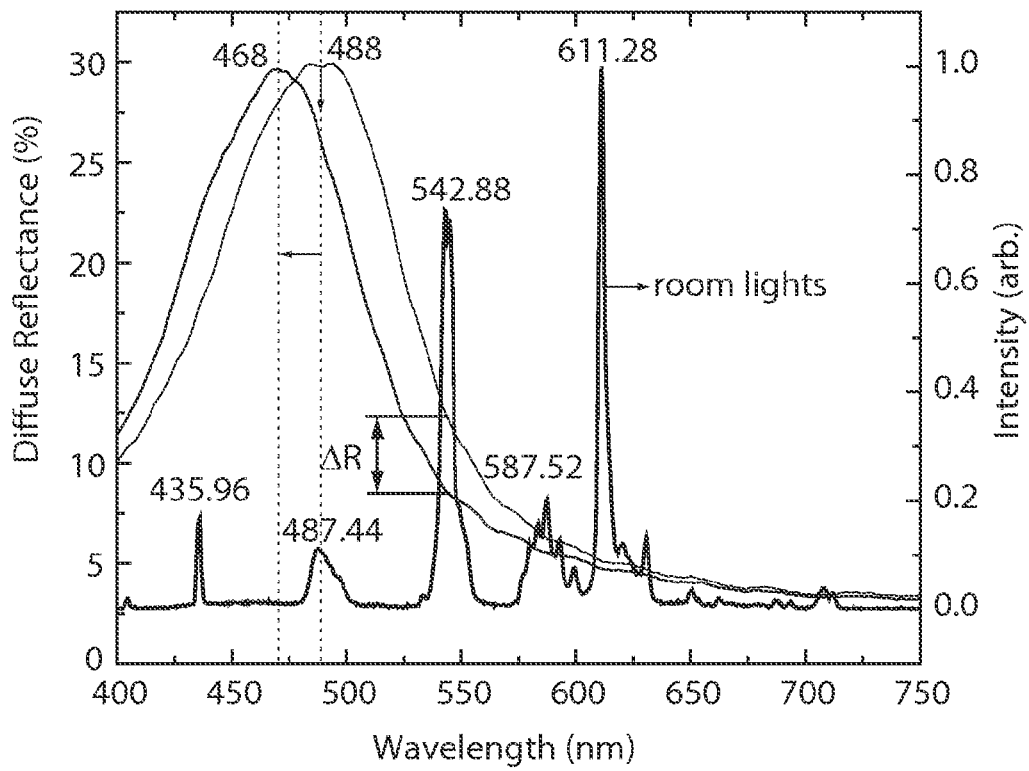
FIG. 3 is a visible light spectrum of two blue light reflecting liquid crystal cells overlaid on an illuminant visible light spectrum.
Figure 4:
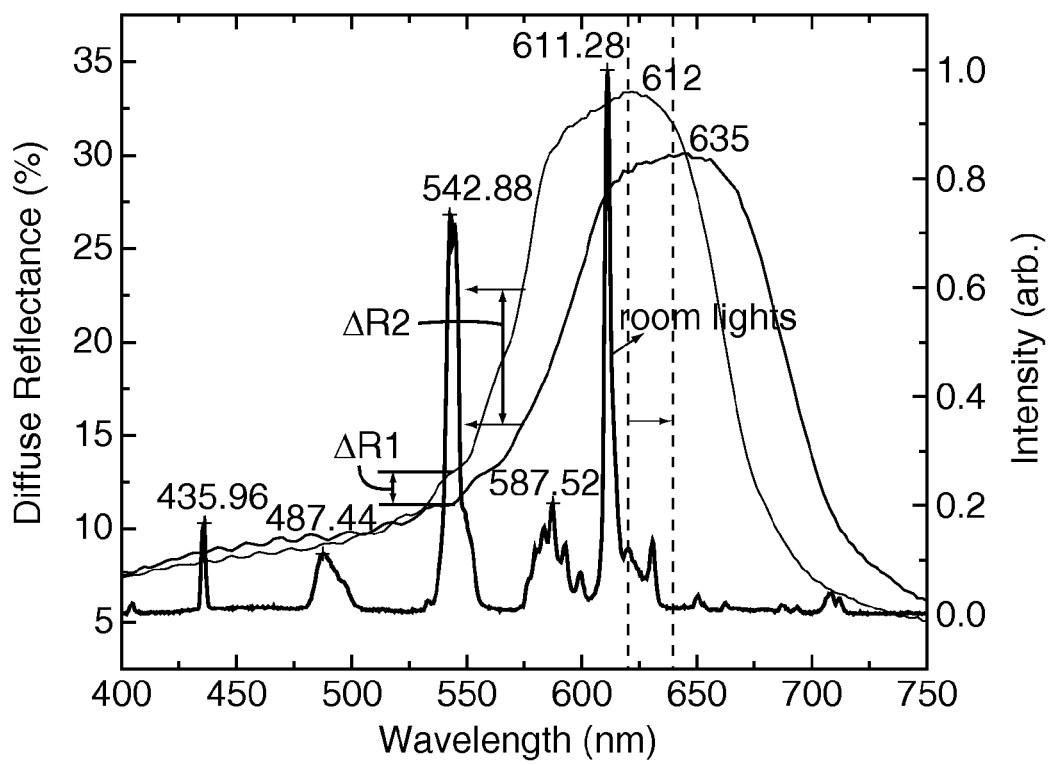
FIG. 4 is a visible light spectrum of two red light reflecting liquid crystal cells overlaid on an illuminant visible light spectrum.
Figure 5:
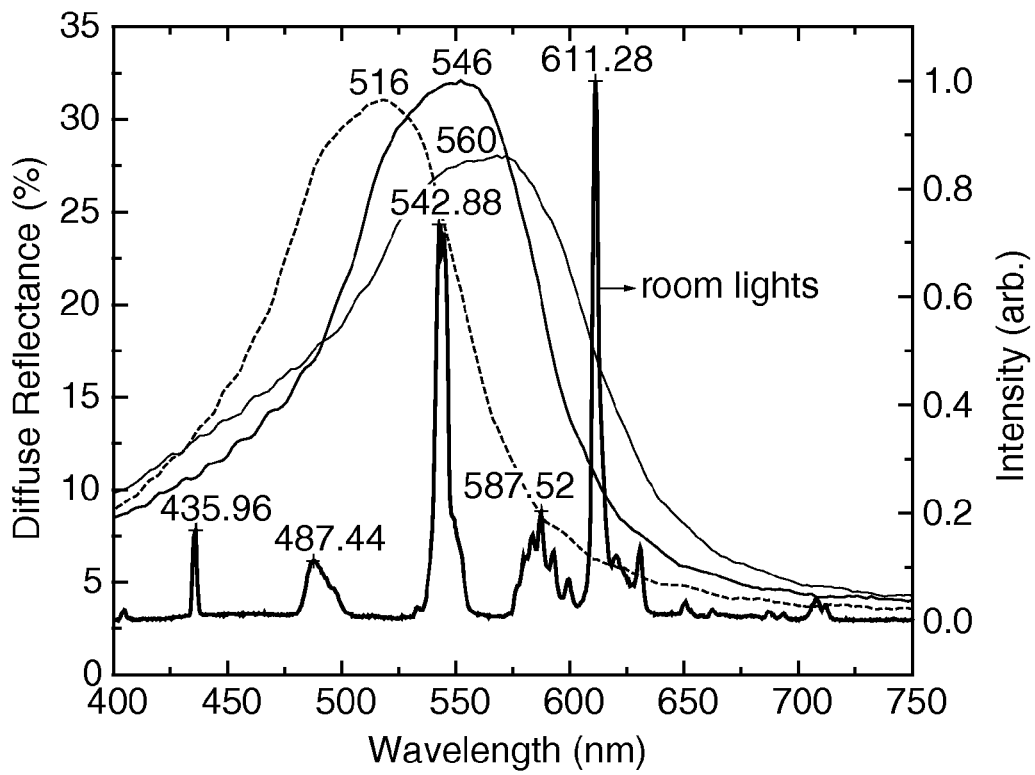
FIG. 5 is a visible light spectrum of three green light reflecting liquid crystal cells overlaid on an illuminant visible light spectrum.

Each display device was illuminated with a commercially available fluorescent room light. The visible light spectrum for this illuminant light is shown in FIGS. 3-5 and is labeled room lights. The reflection spectrum of seven cholesteric liquid crystal devices, with reflection bands tuned across the visible spectrum, are compared to that of the fluorescent room light labeled room lights. The devices were switched to their planar reflective state prior to measuring their reflection spectra using a scanning Perkin Elmer, Lambda 900 spectrometer. The incident light was at 5 degrees from the normal to the surface and the specular reflection was blocked. All diffuse reflected light was collected onto a detector by an integrating sphere.

FIG. 3 is a visible light spectrum of two blue light reflecting liquid crystal cells overlaid on an illuminant visible light spectrum, FIG. 4 is a visible light spectrum of two red light reflecting liquid crystal cells overlaid on an illuminant visible light spectrum, and FIG. 5 is a visible light spectrum of three green light reflecting liquid crystal cells overlaid on an illuminant visible light spectrum.

The reflectance spectrum of two blue reflecting cholesteric liquid crystal display devices (peak wavelength of 468 nm and 488 nm) are shown in FIG. 3. The 488 nm sample has a peak reflectance centered on the peak of the blue emission line of the fluorescent illuminant light while the reflectance peak of the 468 nm sample is shifted to shorter wavelengths. The 488 nm sample has a higher reflectivity at both the illuminant blue emission wavelength (488 nm) and at the 543 nm green emission line ($\Delta R$). The 468 nm sample had a decrease in reflectance at illuminant peak to about 85% of peak reflectance. Since the photopic response weights the 543 nm line much more than the 488 nm line, on-axis the 488 nm sample appears blue-green, while the 468 nm sample appears more true blue. Off-axis, the reflectance spectra of both the 468 nm and 488 samples shift towards the blue or shorter wavelengths.

Achieving a good red primary is a significant challenge in a cholesteric liquid crystal display. Since the cholesteric liquid crystal reflection spectrum is broad, the short wavelength edge of the red primary leaks into the green region of the spectrum where the photopic response is much higher. This significantly degrades the color saturation of the red. The reflectance spectrum of two red reflecting cholesteric liquid crystal display devices (peak wavelength of 612 nm and 635 nm) are shown in FIG. 4. The 612 nm sample has a peak reflectance centered on the peak of the red emission line of the fluorescent illuminant light while the reflectance peak of the 635 nm sample is shifted to longer wavelengths. The 612 nm sample has a significant overlap with the green illuminant light peak at 543 nm. This causes the sample to appear yellowish orange. Moving the on-axis peak reflectance wavelength from 612 nm to 635 nm reduces the overlap with the illuminant's 543 nm green emission line and significantly improves the red primary. On-axis this sample (635 nm) appears much redder than the 612 nm sample. The differences between the two samples are identified when viewing them off-axis. Both reflection spectra shift to shorter wavelengths, towards the 543 nm green line. Since the slopes of the two spectra at a given wavelength are different, the difference in reflectance at the 543 nm line the two samples, off-axis $\Delta R2$, is much greater than the difference on-axis $\Delta R1$. Off-axis the 612 nm sample has a higher reflectivity at the 543 nm line than the 635 nm sample. As a result, when viewed off-axis, the 612 nm sample exhibits a significant color shift from yellowish orange to yellow-green. The color shift of the 635 nm sample, while perceptible, is not significant.

Centering the reflectance peak of the cholesteric liquid crystal green primary on the dominate green emission line present in the illuminant light maximizes the brightness of the green primary of the cholesteric liquid crystal display. This also minimizes the overlap of the cholesteric liquid crystal reflection spectrum with the emission lines to the red and the blue that are present in the illuminant light. This results in better color saturation. The reflectance spectrum of three green reflecting cholesteric liquid crystal display devices (peak wavelength of 516 nm, 546 nm, and 560 nm) are shown in FIG. 5. The 546 nm sample is generally considered "centered" on the 543 nm illuminate green light peak. On-axis, the 546 nm sample yielded the brightest and most saturated green color. The 516 nm sample has significant overlap with the blue illuminate light peak. As a result, this sample appears blue-green. On the other hand the 560 nm sample has higher reflectivity than the 546 nm sample at both the red (612 nm) and orange (587 nm) illuminate light emission lines. Consequently, this sample appears yellow-green. Off-axis the reflection spectra of all three samples shift toward the blue light region. This causes the 516 nm sample to appear blue, the 546 nm sample to appear blue-green, and the 560 nm sample to appear pale-green. Off-axis the 560 nm sample may yield the best green color. Depending on the viewing angle, determined by specific application, the 560 nm sample may be the better choice for the green primary in the cholesteric liquid crystal display.

Thus, embodiments of the COLOR LIQUID CRYSTAL DISPLAY PANEL DESIGN are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of forming a liquid crystal display comprising:
   measuring an illuminant to determine an illuminant blue peak wavelength, an illuminant green peak wavelength, and an illuminant red peak wavelength;
   assembling a reflective bistable cholesteric liquid crystal display with a blue light reflecting liquid crystal layer having a blue peak reflection wavelength being a shorter wavelength than the measured illuminant blue peak wavelength, and a green light reflecting liquid crystal layer having a green peak reflection wavelength substantially equal to or longer than the measured illuminant green peak wavelength, and a red light reflecting liquid crystal layer having a red peak reflection wavelength being a longer wavelength than the measured illuminant red peak wavelength.

2. The method according to claim 1, wherein the blue light reflecting liquid crystal layer has a peak reflectance value and the blue light reflecting liquid crystal layer has a reflectance value in a range of 50 to 90% of the peak reflectance value at the measured illuminant blue peak wavelength.

3. The method according to claim 1, wherein the red light reflecting liquid crystal layer has a peak reflectance value and the red light reflecting liquid crystal layer has a reflectance value in a range of 50 to 90% of the peak reflectance value at the measured illuminant red peak wavelength.

4. The method according to claim 1, wherein the blue light reflecting liquid crystal layer has a peak reflectance value and the blue light reflecting liquid crystal layer has a reflectance value in a range of 70 to 90% of the peak reflectance value at the measured illuminant blue peak wavelength and the red light reflecting liquid crystal layer has a peak reflectance value and the red light reflecting liquid crystal layer has a reflectance value in a range of 70 to 90% of the peak reflectance value at the measured illuminant red peak wavelength.

5. The method according to claim 1, wherein the blue light reflecting liquid crystal layer has a peak reflectance value and the blue light reflecting liquid crystal layer has a reflectance value in a range of 80 to 90% of the peak reflectance value at the measured illuminant blue peak wavelength and the red light reflecting liquid crystal layer has a peak reflectance value and the red light reflecting liquid crystal layer has a reflectance value in a range of 80 to 90% of the peak reflectance value at the measured illuminant red peak wavelength.

6. The method according to claim 1, wherein the assembling step comprises stacking the blue light reflecting liquid crystal layer, green light reflecting liquid crystal layer, and red light reflecting liquid crystal layer, on one another to form a three layer display stack.

7. The method according to claim 1, wherein the illuminant is a fluorescent light source.

8. The method according to claim 1, wherein the green light reflecting liquid crystal layer has a peak reflectance wavelength longer than the measured illuminant green peak wavelength.

9. A reflective bistable cholesteric liquid crystal display comprising:
   a blue light reflecting liquid crystal layer having a blue peak reflection wavelength;
   a green light reflecting liquid crystal layer having a green peak reflection wavelength; and
   a red light reflecting liquid crystal layer having a red peak reflection wavelength;
   wherein, the reflective bistable cholesteric liquid crystal display is configured to be illuminated by an illuminant having an illuminant measured blue peak wavelength, an illuminant measured green peak wavelength, and an illuminant measured red peak wavelength, and the blue light reflecting liquid crystal layer blue peak reflection wavelength is a shorter wavelength than the illuminant measured blue peak wavelength, the green light reflecting liquid crystal layer green peak reflection wavelength is substantially equal to or longer than the illuminant measured green peak wavelength, and the red light reflecting liquid crystal layer red peak reflection wavelength is a longer wavelength than the illuminant measured red peak wavelength.

10. The liquid crystal display according to claim 9, wherein the blue light reflecting liquid crystal layer has a peak reflectance value and the blue light reflecting liquid crystal layer has a reflectance value in a range of 50 to 90% of the peak reflectance value at the illuminant measured blue peak wavelength.

11. The liquid crystal display according to claim 9, wherein the red light reflecting liquid crystal layer has a peak reflectance value and the red light reflecting liquid crystal layer has a reflectance value in a range of 50 to 90% of the peak reflectance value at the illuminant measured red peak wavelength.

12. The liquid crystal display according to claim 9, wherein the blue light reflecting liquid crystal layer has a peak reflectance value and the blue light reflecting liquid crystal layer has a reflectance value in a range of 70 to 90% of the peak reflectance value at the illuminant measured blue peak wavelength and the red light reflecting liquid crystal layer has a peak reflectance value and the red light reflecting liquid crystal layer has a reflectance value in a range of 70 to 90% of the peak reflectance value at the measured illuminant red peak wavelength.

13. The liquid crystal display according to claim 9, wherein the blue light reflecting liquid crystal layer has a peak reflectance value and the blue light reflecting liquid crystal layer has a reflectance value in a range of 80 to 90% of the peak reflectance value at the illuminant measured blue peak wavelength and the red light reflecting liquid crystal layer has a peak reflectance value and the red light reflecting liquid crystal layer has a reflectance value in a range of 80 to 90% of the peak reflectance value at the illuminant measured red peak wavelength.

14. The liquid crystal display according to claim 9, wherein the blue light reflecting liquid crystal layer, green light reflecting liquid crystal layer, and red light reflecting liquid crystal layer are disposed on one another to form a three layer display stack.

15. The liquid crystal display according to claim 9, wherein the liquid crystal display is configured to be illuminated by a fluorescent illuminant.

16. The liquid crystal display according to claim 9, wherein the green light reflecting liquid crystal layer has a peak reflectance wavelength longer than the illuminant measured green peak wavelength.

* * * * *